United States Patent
Naitou et al.

(10) Patent No.: US 11,155,678 B2
(45) Date of Patent: Oct. 26, 2021

(54) METHOD FOR SEPARATING PERFLUORO(POLY)ETHER-GROUP-CONTAINING ALCOHOL COMPOUNDS

(71) Applicant: DAIKIN INDUSTRIES, LTD., Osaka (JP)

(72) Inventors: Masato Naitou, Osaka (JP); Takashi Nomura, Osaka (JP); Shinya Takano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/327,611

(22) PCT Filed: Aug. 24, 2017

(86) PCT No.: PCT/JP2017/030356
§ 371 (c)(1),
(2) Date: Feb. 22, 2019

(87) PCT Pub. No.: WO2018/038213
PCT Pub. Date: Mar. 1, 2018

(65) Prior Publication Data
US 2019/0185621 A1    Jun. 20, 2019

(30) Foreign Application Priority Data

Aug. 25, 2016 (JP) .............................. JP2016-164624

(51) Int. Cl.
*C08G 65/30* (2006.01)
*B01D 15/34* (2006.01)
*B01D 15/38* (2006.01)
*B01D 15/42* (2006.01)

(52) U.S. Cl.
CPC ............ *C08G 65/30* (2013.01); *B01D 15/34* (2013.01); *B01D 15/3876* (2013.01); *B01D 15/426* (2013.01)

(58) Field of Classification Search
CPC ........ C08G 65/30; C07C 41/36; B01D 15/42; B01D 15/203; B01D 15/426; B01D 15/34; B01D 15/3876
See application file for complete search history.

(56) References Cited

U.S. PATENT DOCUMENTS

| 5,260,834 A | 11/1993 | Shibata et al. | |
| 5,262,057 A * | 11/1993 | Tonelli | B01D 15/08 |
| | | | 210/656 |
| 5,910,614 A * | 6/1999 | Turri | C08G 65/30 |
| | | | 210/656 |
| 9,145,471 B2 * | 9/2015 | Tonelli | C08G 65/30 |
| 9,951,222 B2 * | 4/2018 | Yamane | B01D 15/12 |
| 2006/0009660 A1 * | 1/2006 | Tchistiakov | C08G 65/30 |
| | | | 568/677 |
| 2008/0194887 A1 * | 8/2008 | Curran | C07B 39/00 |
| | | | 570/136 |
| 2011/0180481 A1 * | 7/2011 | Chordia | B01D 15/165 |
| | | | 210/656 |

FOREIGN PATENT DOCUMENTS

| EP | 0 538 827 A2 | 4/1993 |
| EP | 0 538 828 A2 | 4/1993 |
| EP | 1 614 703 A1 | 1/2006 |
| JP | 04-307509 A | 10/1992 |
| JP | 2006-022334 A | 1/2006 |

OTHER PUBLICATIONS

Tsai ("Environmental risk assessment of hydrofluoroethers (HFEs)", Journal of Hazardous Materials, vol. A119, Jan. 2005, pp. 69-78). (Year: 2005).*
International Search Report for PCT/JP2017/030356 dated Nov. 28, 2017 [PCT/ISA/210].
International Preliminary Report on Patentability and Translation of Written Opinion, dated Mar. 7, 2019 from the International Bureau in counterpart International application No. PCT/JP2017/030356.
Communication dated Apr. 6, 2020, from the European Patent Office in European Application No. 17843689.5.

* cited by examiner

*Primary Examiner* — Rosalynd A Keys
(74) *Attorney, Agent, or Firm* — Sughrue Mion, PLLC

(57) ABSTRACT

A method for chromatographically separating a mixture containing a perfluoro(poly)ether group-containing monoalcohol compound represented by the following formula (2) and a perfluoro(poly)ether group-containing dialcohol compound represented by the following formula (3):

$$A\text{-}Pf\text{-}Z \quad (2)$$

$$Z\text{-}Pf\text{-}Z \quad (3)$$

wherein Pf represents a divalent perfluoropolyether group and A and Z are as defined herein, the method including: adsorbing the mixture onto a stationary phase, and eluting the perfluoro(poly)ether group-containing monoalcohol compound represented by formula (2) by one mobile phase selected from hydrofluorocarbons, hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3).

14 Claims, No Drawings

METHOD FOR SEPARATING PERFLUORO(POLY)ETHER-GROUP-CONTAINING ALCOHOL COMPOUNDS

CROSS REFERENCE TO RELATED APPLICATIONS

This application is a National Stage of International Application No. PCT/JP2017/030356 filed Aug. 24, 2017, claiming priority based on Japanese Patent Application No. 2016-164624 filed Aug. 25, 2016.

TECHNICAL FIELD

The present invention relates to a method for separating a perfluoro(poly)ether group-containing alcohol compound.

BACKGROUND ART

Perfluoro(poly)ether group-containing compounds are known to be capable of providing excellent water-repellency, oil-repellency, antifouling properties, heat resistance, low-temperature properties, oil resistance, solvent resistance, chemical resistance, lubricity, low-friction properties, abrasion resistance, mold releasability, and the like. Functional thin films containing a perfluoro(poly)ether group-containing compound is used in various substrates such as glass, plastics, fibers, metals, and construction materials. Fluorine-based elastomers containing a perfluoro(poly)ether group-containing compound are used as materials that are durable and reliable under severe environments of automobile, aircraft, semiconductor, aerospace, and like fields. In addition, perfluoro(poly)ether group-containing compounds can impart and exert excellent performance by being used as intermediate compounds or additives for resins such as acrylic resins, polyurethane, epoxy resins, polyester resins, and laminated resins, coating materials, cosmetics, and the like. Accordingly, research has been extensively carried out into procedures for synthesizing perfluoro(poly)ether group-containing compounds having various structures. In the synthesis of such a perfluoro(poly)ether group-containing compound, a perfluoro(poly)ether group-containing compound having a functional group is an important compound as a source material compound or an intermediate.

In general, the source material compound or the intermediate desirably has a higher purity. This is because a higher purity facilitates purification of the reaction product and, moreover, can reduce by-products or unidentified substances that can result from the reaction, and thus the target product having better performance can be obtained. The source material compound or the intermediate is usually produced as a mixture of a nonfunctional compound, a monofunctional compound having a functional group only at one terminal, and a bifunctional compound having a functional group at both terminals. Accordingly, to date, various studies have been conducted on a method for separating a desired source material compound or intermediate from a mixture of the source material compound or the intermediate.

For example, Japanese Patent Laid-Open No. 4-307509 (Patent Literature 1) discloses a method for separating a nonfunctional species, a monofunctional species, and a bifunctional species from a mixture of a polymer constituting perfluoropolyoxyalkylene. Japanese Patent Laid-Open No. 2006-022334 (Patent Literature 2) discloses a method for separating bifunctional perfluoropolyether having —CH$_2$OH terminals from a mixture with —CH$_2$OH monofunctional perfluoropolyether.

PRIOR ART LITERATURE

Patent Literature

Patent Literature 1
  Japanese Patent Laid-Open No. 4-307509
Patent Literature 2
  Japanese Patent Laid-Open No. 2006-022334

SUMMARY OF THE INVENTION

Problem to be Solved by the Invention

In Patent Literature 1, the perfluoropolyoxyalkylene mixture adsorbed on a stationary phase is separated by elution using a 9/1 to 1/1 mixture of a nonpolar solvent and a polar solvent. In Patent Document 1, the mixing ratio of the nonpolar solvent and the polar solvent is adjusted to carry out separation, and therefore investigations to determine an appropriate mixing ratio of the solvents are required. Moreover, the use of a mixed solvent is problematic in that the recovery of respective solvents after separation is difficult.

In Patent Literature 2, separation is carried out by repeatedly performing the step of mixing an adsorbing solid phase with a perfluoropolyether mixture and stirring the mixture to adsorb the perfluoropolyether mixture that is rich in bifunctional perfluoropolyether onto the adsorbing solid phase, and then eluting the bifunctional perfluoropolyether from the adsorbing solid phase. In Patent Literature 2, the operations need to be repeatedly performed and are thus troublesome. Moreover, other perfluoropolyether species in addition to the bifunctional perfluoropolyether are also adsorbed onto the adsorbing solid phase. It is therefore difficult to separate perfluoropolyether having high purity.

Accordingly, an object of the present invention to provide a method capable of easily separating a mixture of a monofunctional compound and a bifunctional compound in a high-purity manner.

Means to Solve the Problem

As a result of having conducted diligent research, the inventors found that in a method for separating a mixture containing perfluoro(poly)ether group-containing alcohol compounds by chromatography involving a mobile phase and a stationary phase, the use of one selected from the group consisting of hydrofluorocarbons, hydrochlorofluorocarbons, hydrofluoroethers, fluorine-containing ester solvents, and fluorine-containing aromatic solvents as a mobile phase makes it possible to separate a perfluoro(poly)ether group-containing monoalcohol compound having a hydroxyl group at only one terminal and a perfluoro(poly)ether group-containing dialcohol compound having a hydroxyl group at both terminals, and the inventors accomplished the present invention.

According to the first aspect of the present invention, provided is:

A method for chromatographically separating a mixture containing a perfluoro(poly)ether group-containing monoalcohol compound represented by the following formula (2) and a perfluoro(poly)ether group-containing dialcohol compound represented by the following formula (3):

A-Pf-Z    (2)

Z-Pf-Z    (3)

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

adsorbing the mixture onto a stationary phase, and eluting the perfluoro(poly)ether group-containing monoalcohol compound represented by formula (2) by one mobile phase selected from the group consisting of hydrofluorocarbons, hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3).

According to the second aspect of the present invention, provided is:

A method for chromatographically separating a mixture containing:

a perfluoro(poly)ether group-containing nonalcohol compound represented by the following formula (1), a perfluoro(poly)ether group-containing monoalcohol compound represented by the following formula (2), and a perfluoro(poly)ether group-containing dialcohol compound represented by the following formula (3):

A-Pf-A    (1)

A-Pf-Z    (2)

Z-Pf-Z    (3)

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

(i) adsorbing the mixture onto a stationary phase, (ii) eluting the perfluoro(poly)ether group-containing nonalcohol compound represented by formula (1) by a mobile phase selected from nonpolar solvents or low-polarity solvents to separate the perfluoro(poly)ether group-containing nonalcohol compound represented by formula (1) from the perfluoro(poly)ether group-containing monoalcohol compound represented by formula (2) and the perfluoro(poly)ether group-containing dialcohol compound represented by formula (3), (iii) eluting the perfluoro(poly)ether group-containing monoalcohol compound represented by formula (2) by one mobile phase selected from the group consisting of hydrofluorocarbons, hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3), and (iv) increasing a temperature of the stationary phase to elute the perfluoro(poly)ether group-containing dialcohol compound represented by formula (3) by one mobile phase selected from the group consisting of hydrofluorocarbons, hydrochlorofluorocarbons, hydrofluoroethers, fluorine-containing ester solvents, and fluorine-containing aromatic solvents.

According to the third aspect of the present invention, provided is:

A method for producing a perfluoro(poly)ether group-containing monoalcohol compound represented by the following formula (2):

A-Pf-Z    (2)

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

eluting the perfluoro(poly)ether group-containing monoalcohol compound represented by formula (2) from a mixture containing the perfluoro(poly)ether group-containing monoalcohol compound represented by formula (2) and a perfluoro(poly)ether group-containing dialcohol compound represented by the following formula (3):

Z-Pf-Z    (3)

wherein

Pf, A, and Z are as defined above, by using one mobile phase selected from the group consisting of hydrofluorocarbons, hydrochlorofluorocarbons, hydrofluoroethers, fluorine-containing ester solvents, and fluorine-containing aromatic solvents in chromatography involving a stationary phase to purify the perfluoro(poly)ether group-containing monoalcohol compound represented by formula (2).

According to the fourth aspect of the present invention, provided is:

A method for producing a perfluoro(poly)ether group-containing dialcohol compound represented by the following formula (3):

Z-Pf-Z    (3)

wherein

Pf represents a divalent perfluoropolyether group, $R^1$ each independently represents an alkyl group, $R^2$ each independently represents an alkyl group, $R^3$ each independently represents a divalent organic group containing 1 to 4 carbon atoms, Z each independently represents an —R$^5$—CH$_2$OH group or an —O—R$^5$—CH$_2$OH group, and R$^5$ each independently represents a bond or a divalent organic group containing 1 to 4 carbon atoms, the method comprising:

eluting a perfluoro(poly)ether group-containing monoalcohol compound represented by the following formula (2):

A-Pf-Z    (2)

wherein

Pf, and Z are as defined above, and

A each independently represents an R$^1$— group, an R$^1$—O— group, an R$^2$O—CH$_2$—R$^3$— group, or an R$^2$O—CH$_2$—R$^3$—O— group, from a mixture containing the perfluoro(poly)ether group-containing dialcohol compound represented by formula (3) and the perfluoro(poly)ether group-containing monoalcohol compound represented by formula (2) by using one mobile phase selected from the group consisting of hydrofluorocarbons, hydrochlorofluorocarbons, hydrofluoroethers, fluorine-containing ester solvents, and fluorine-containing aromatic solvents in chromatography involving a stationary phase, and then increasing a column temperature to elute the perfluoro(poly)ether group-containing dialcohol compound represented by formula (3) by using one mobile phase selected from the group consisting of hydrofluorocarbons, hydrochlorofluorocarbons, hydrofluoroethers, fluorine-containing ester solvents, and fluorine-containing aromatic solvents to purify the perfluoro(poly)ether group-containing dialcohol compound represented by formula (3).

Effect of the Invention

According to the present invention, the use of one solvent selected from the group consisting of hydrofluorocarbons, hydrochlorofluorocarbons, hydrofluoroethers, fluorine-containing ester solvents, and fluorine-containing aromatic solvents as a mobile phase makes it possible to separate a perfluoro(poly)ether group-containing monoalcohol compound and a perfluoro(poly)ether group-containing dialcohol compound.

EMBODIMENTS TO CARRY OUT THE INVENTION

Below, the method of the present invention will now be described in detail.

The present invention relates to a method for separating a mixture containing a perfluoro(poly)ether group-containing monoalcohol compound and a perfluoro(poly)ether group-containing dialcohol compound into the respective compounds by chromatography involving a mobile phase and a stationary phase.

The perfluoro(poly)ether group-containing monoalcohol compound is a compound represented by the following formula (2), and the perfluoro(poly)ether group-containing dialcohol compound is a compound represented by the following formula (3).

A-Pf-Z    (2)

Z-Pf-Z    (3)

The mixture to be separated by the method of the present invention contains the compounds represented by formulae (2) and (3). The mixture may contain two or more compounds represented by formula (2) and two or more compounds represented by formula (3).

In one embodiment, the mixture may further contain a perfluoro(poly)ether group-containing nonalcohol compound represented by the following formula (1).

A-Pf-A    (1)

In formulae (1) to (3), Pf is a divalent perfluoropolyether group.

In a preferable embodiment, Pf is a group represented by the following structural formula:

wherein a, b, c, and d are each independently an integer of 0 or 1 or more, and the sum of a, b, c, and d is at least 1. Preferably, a, b, c, and d are each independently an integer of 0 or more and 200 or less, such as an integer of 1 to 200, and more preferably each independently an integer of 0 to 100. Preferably, the sum of a, b, c, and d is 5 or more, and more preferably 10 or more, such as 10 or more and 100 or less. The occurrence order of the respective repeating units in parentheses with the subscript a, b, c or d is not limited in the formula. Among these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)—, and —(OCF$_2$CF(C$_2$F$_5$))—, and is preferably —(OCF$_2$CF$_2$CF$_2$CF$_2$)—. —(OC$_3$F$_6$)— may be any of —(OCF$_2$CF$_2$CF$_2$)—, —(OCF(CF$_3$)CF$_2$)—, and —(OCF$_2$CF(CF$_3$))—, and is preferably —(OCF$_2$CF$_2$CF$_2$)—. —(OC$_2$F$_4$)— may be any of —(OCF$_2$CF$_2$)— and —(OCF(CF$_3$))—, and is preferably —(OCF$_2$CF$_2$)—.

In one embodiment, Pf is —(OC$_3$F$_6$)$_b$—, wherein b is an integer of 1 or more and 200 or less, preferably 5 to 200, and more preferably 10 to 200, is preferably —(OCF$_2$CF$_2$CF$_2$)$_b$—, wherein b is an integer of 1 or more and 200 or less, preferably 5 to 200, and more preferably 10 to 200, or —(OCF(CF$_3$)CF$_2$)$_b$—, wherein b is an integer of 1 or more and 200 or less, preferably 5 to 200, and more preferably 10 to 200, and is more preferably —(OCF$_2$CF$_2$CF$_2$)$_b$—, wherein b is an integer of 1 or more and 200 or less, preferably 5 to 200, and more preferably 10 to 200.

In another embodiment, Pf is —(OC$_4$F$_8$)$_a$—(OC$_3$F$_6$)$_b$—(OC$_2$F$_4$)$_c$—(OCF$_2$)$_d$—, wherein a and b are each independently an integer of 0 or more and 30 or less, c and d are each independently an integer of 1 or more and 200 or less, preferably 5 to 200, and more preferably 10 to 200, and the occurrence order of the respective repeating units in parentheses with the subscript a, b, c or d is not limited in the formula, and is preferably —(OCF$_2$CF$_2$CF$_2$CF$_2$)$_a$—(OCF$_2$CF$_2$CF$_2$)$_b$—(OCF$_2$CF$_2$)$_c$—(OCF$_2$)$_d$—. In one embodiment, Pf may be —(OC$_2$F$_4$)$_c$—(OCF$_2$)$_d$—, wherein c and d are each independently an integer of 1 or more and 200 or less, preferably 5 to 200, and more preferably 10 to 200, and the occurrence order of the respective repeating units in parentheses with the subscript c or d is not limited in the formula.

In yet another embodiment, Pf is a group represented by —(R$^8$—R$^{11}$)$_f$— wherein R$^8$ is OCF$_2$ or OC$_2$F$_4$ and preferably OC$_2$F$_4$. In a preferable embodiment, Pf is a group represented by —(OC$_2$F$_4$—R$^{11}$)$_f$—, wherein R$^{11}$ is a group selected from OC$_2$F$_4$, OC$_3$F$_6$, and OC$_4$F$_8$, or is a combination of 2 or 3 groups independently selected from these groups. Examples of the combination of 2 or 3 groups independently selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_3F_6OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. f is an integer of 2 or more and 100 or less, and preferably an integer of 2 to 50. In the formulae, $OC_2F_4$, $OC_3F_6$, and $OC_4F_8$ may be either linear or branched, and is preferably linear. In this embodiment, Pf is preferably —$(OC_2F_4$—$OC_3F_6)_f$— or —$(OC_2F_4$—$OC_4F_8)_f$—.

The number average molecular weight of Pf in formulae (1) to (3) is preferably 500 to 100,000, more preferably 1,000 to 50,000, and even more preferably 1,500 to 20,000. The number average molecular weight is a value measured by $^{19}$F-NMR.

In formulae (1) and (2), the A group each independently represents an $R^1$— group, an $R^1$—O— group, an $R^2O$—$CH_2$—$R^3$— group, or an $R^2O$—$CH_2$—$R^3$—O— group.

$R^1$ each independently represents an alkyl group. This alkyl group may have a substituent. The substituent is, for example, a halogen atom such as a fluorine atom or a chlorine atom, an amino group, or a sulfonyl group, preferably a halogen atom, and more preferably a fluorine atom or a chlorine atom.

In a preferable embodiment, the alkyl group may be a $C_{1-16}$ perfluoroalkyl group or $R_6$—$(C_{g+1}F_{2g+2})$, and preferably a $C_{1-16}$ perfluoroalkyl group or a group represented by $R^6$—$CF_2(CF_2)_g$—, wherein g is an integer of 0 or more and 15 or less, preferably an integer of 0 to 10, more preferably an integer of 0 to 6, and even more preferably an integer of 1 to 4.

$R^6$ represents a hydrogen atom or a halogen atom other than fluorine. The halogen atom other than fluorine may preferably be a chlorine atom or an iodine atom, and more preferably a chlorine atom. $R^6$ is preferably a hydrogen atom or a chlorine atom. In one embodiment, $R^6$ is a hydrogen atom. In another embodiment, $R^6$ is a chlorine atom.

The $C_{1-16}$ perfluoroalkyl group may be a linear or branched perfluoroalkyl group having 1 to 16 carbon atoms, preferably a linear or branched perfluoroalkyl group having 1 to 6 carbon atoms, more preferably a perfluoroalkyl group having 1 to 3 carbon atoms, and more specifically —$CF_3$, —$CF_2CF_3$, or —$CF_2CF_2CF_3$.

In a preferable embodiment, $R^1$ may be a $C_{1-16}$ perfluoroalkyl group, $HCF_2(CF_2)_g$—, or $ClCF_2(CF_2)_g$—, wherein g may be an integer of 0 or more and 15 or less.

$R^2$ represents an alkyl group. $R^2$ is preferably a $C_{1-4}$ alkyl group. The $C_{1-4}$ alkyl group is, for example, a linear or branched $C_{1-4}$ alkyl group. Specific examples of the $C_{1-4}$ alkyl group include a methyl group, an ethyl group, a n-propyl group, an isopropyl group, a n-butyl group, a 2-butyl group, an isobutyl group, and a t-butyl group. $R^2$ is more preferably a methyl group or an ethyl group. These alkyl groups may have a substituent. The substituent is, for example, a halogen atom such as a fluorine atom or a chlorine atom.

$R^3$ each independently represents a divalent organic group containing 1 to 4 carbon atoms.

Specific examples of the "divalent organic group containing 1 to 4 carbon atoms" include a $C_{1-4}$ alkylene group, a $C_{1-4}$ fluoroalkylene group, or a $C_{1-4}$ perfluoroalkylene group.

Examples of the $C_{1-4}$ alkylene group include —$CH_2$—, —$C_2H_4$—, —$C_3H_6$—, and —$C_4H_8$—. Here, —$C_3H_6$— and —$C_4H_8$— may be linear or branched. The $C_{1-4}$ fluoroalkylene group may be a group in which some hydrogen atoms of the above $C_{1-4}$ alkylene group are substituted with fluorine atoms. The $C_{1-4}$ perfluoroalkylene group may be a group in which all hydrogen atoms of the above $C_{1-4}$ alkylene group are substituted with fluorine atoms.

$R^3$ is preferably each independently —$CF_2$—, —$CF_2CF_2$—, —$CH_2CF_2$—, —$CF_2CH_2$—, —$CF_2CF_2CF_2$—, —$CF(CF_3)CF_2$—, —$CF(CF_3)CH_2$—, —$CF_2CF_2CH_2$—, —$CH_2CF_2CF_2$—, or —$CH_2CF(CF_3)$—.

In formulae (2) and (3), Z each independently represents an —$R^5$—$CH_2OH$ group or an —O—$R^5$—$CH_2OH$ group.

$R^5$ represents a bond or a divalent organic group containing 1 to 4 carbon atoms. The "divalent organic group containing 1 to 4 carbon atoms" is as defined in connection with $R^3$.

As used herein, the "bond" means a simple bond not having an atom, i.e., a single bond. For example, when $R^5$ is a bond, the Z group in the case of being an —O—$R^5$—$CH_2OH$ group represents —O—$CH_2OH$ group.

$R^5$ is preferably each independently —$CF_2$—, —$CF_2CF_2$—, —$CH_2CF_2$—, —$CF_2CH_2$—, —$CF_2CF_2CF_2$—, —$CF(CF_3)CF_2$—, —$CF(CF_3)CH_2$—, —$CF_2CF_2CH_2$—, —$CH_2CF_2CF_2$—, or —$CH_2CF(CF_3)$—, and is preferably —$CF_2$—, —$CF_2CF_2$—, or —$CF_2CF_2CF_2$—.

In a preferable embodiment, Z is each independently a —$CH_2OH$ group, a —$CF_2$—$CH_2OH$ group, a —$CF_2CF_2$—$CH_2OH$ group, or a —$CF_2CF_2CF_2$—$CH_2OH$ group.

The compounds represented by formulae (1) to (3) are preferably 1,000 to 100,000, more preferably 2,000 to 10,000, and even more preferably 2,000 to 4,500.

The perfluoro(poly)ether group-containing nonalcohol compound represented by formula (1) may be, for example, compounds shown below.

TABLE 1

| | |
|---|---|
| $R^1$-Pf-O—$R^1$ | (1-a) |
| $R^2O$—$CH_2$—$R^3$-Pf-O—$R^3$—$CH_2$—$OR^2$ | (1-b) |
| $R^1$-Pf-O—$R^3$—$CH_2$—$OR^2$ | (1-c) |
| $R^2O$—$CH_2$—$R^3$-Pf-O—$R^1$ | (1-d) |

In the formulae, Pf, $R^1$, $R^2$, and $R^3$ are as defined above.

The perfluoro(poly)ether group-containing monoalcohol compound represented by formula (2) may be, for example, compounds shown below.

TABLE 2

| | |
|---|---|
| $R^1$-Pf-O—$R^5$—$CH_2OH$ | (2-a) |
| $HOCH_2$—$R^5$-Pf-O—$R^1$ | (2-b) |
| $R^2O$—$CH_2$—$R^3$-Pf-O—$R^5$—$CH_2OH$ | (2-c) |
| $HOCH_2$—$R^5$-Pf-O—$R^3$—$CH_2$—$OR^2$ | (2-d) |
| $R^1$-Pf-O—$R^5$—$CH_2OH$ | (2-e) |
| $HOCH_2$—$R^5$-Pf-O—$R^3$—$CH_2$—$OR^2$ | (2-f) |
| $R^2O$—$CH_2$—$R^3$-Pf-O—$R^5$—$CH_2OH$ | (2-g) |
| $HOCH_2$—$R^5$-Pf-O—$R^1$ | (2-h) |

In the formulae, Pf, $R^1$, $R^2$, $R^3$, and $R^5$ are as defined above.

The perfluoro(poly)ether group-containing dialcohol compound represented by formula (3) may be, for example, compounds shown below.

TABLE 3

| |
|---|
| HOCH$_2$—R$^5$-Pf-O—R$^5$—CH$_2$OH    (3-a) |

In the formula, Pf and R$^5$ are as defined above.

The mixture of compounds represented by any of formulae (1) to (3) may be produced by, but not limited to, the following reactions.

Photooxidation reaction involving tetrafluoroethylene and oxygen, and decomposition reaction, reduction reaction, esterification reaction, fluorination reaction, and/or reduction alcoholization reaction of the resulting peroxide Oligomerization reaction of tetrafluorooxetane, and reduction reaction, esterification reaction, fluorination reaction, and/or reduction alcoholization reaction of the resulting oxetane polymer Fluorination reaction, esterification reaction, and/or reduction alcoholization reaction of polyethylene glycol Oligomerization reaction of hexafluoropropylene oxide, and fluorination reaction, esterification reaction, and/or reduction alcoholization reaction of the resulting product.

The above reactions can be carried out under reaction conditions that are commonly used by those skilled in the art.

The separation method of the present invention is carried out by separating the mixture by chromatography involving a stationary phase and a mobile phase.

Examples of the chromatography include, but are not limited to, column chromatography and thin layer chromatography. Column chromatography is preferably used, and flash column chromatography is particularly preferably used.

The stationary phase used in the chromatography is preferably selected from the group consisting of aluminum oxide, silica gel, magnesium oxide, aluminum silicate, magnesium silicate, chemically modified silica gel, and diatomaceous earth.

The stationary phase is more preferably silica gel. Examples of silica gel include unmodified silica gel, amino group-containing silica gel, and cyano group-containing silica gel.

Commercially available silica gel can be used. Examples of commercially available silica gel include Chromatorex (PSQ-100B) manufactured by Fuji Silysia Chemical Ltd., Wakogel C-200 manufactured by Wako Pure Chemical Industries, Ltd., and 115111 Silica Gel 60 manufactured by Merck.

The amount of the stationary phase to be used is suitably selected according to the compound to be separated, the mobile phase to be used, the type of chromatography, and the like. Preferably, the stationary phase is used in an amount in terms of weight equal to or greater than the amount of the mixture to be separated. When the molecular weight of the compound to be separated is relatively small, a larger amount of the stationary phase is preferably used.

In the method of the present invention, first a mixture containing the compound represented by formula (2) and the compound represented by formula (3) is adsorbed onto the stationary phase. The adsorption method is not limited, and may be a method commonly carried out with respect to chromatography.

Next, the compound represented by formula (2) is eluted by allowing a mobile phase to pass through the stationary phase on which the mixture is adsorbed to separate the compound represented by formula (2) from the compound represented by formula (3).

The mobile phase used in the elution of the compound represented by formula (2) is one solvent selected from the group consisting of hydrofluorocarbons, hydrochlorofluorocarbons, hydrofluoroethers, fluorine-containing ester solvents, and fluorine-containing aromatic solvents. The above one solvent means a substantially single solvent. The term "substantially single" means that the presence of impurities that cannot be removed or are hardly removable is allowed.

Examples of the hydrofluorocarbons include hydrofluorocarbons having 3 to 8 carbon atoms, such as CF$_3$CH$_2$CF$_2$CH$_3$, CF$_3$CHFCHFC$_2$F$_5$, 1,1,2,2,3,3,4-heptafluorocyclopentane, CF$_3$CF$_2$CF$_2$CF$_2$CH$_2$CH$_3$, CF$_3$CF$_2$CF$_2$CF$_2$CF$_2$CF$_2$CH$_2$CH$_3$, and CF$_3$CF$_2$CF$_2$CF$_2$CF$_2$CHF$_2$.

Examples of the hydrochlorofluorocarbons include hydrochlorofluorocarbons having 3 to 6 carbon atoms, such as HCFC-225 (CF$_3$CF$_2$CHCl$_2$, CClF$_2$CF$_2$CHClF). A preferable hydrochlorofluorocarbon is HCFC-225.

Examples of the hydrofluoroethers include Novec™ 7000 (C$_3$F$_7$OCH$_3$), Novec™ 7100 (C$_4$F$_9$CCH$_3$), Novec™ 7200 (C$_4$F$_9$OC$_2$H$_5$), Novec™ 7300 (C$_2$F$_5$CF(OCH$_3$)C$_3$F$_7$), and Novec™ 71 IPA. A preferable hydrofluoroether is C$_2$F$_5$CF(OCH$_3$)C$_3$F$_7$ (perfluorohexylmethylether).

Examples of the fluorine-containing ester solvents include fluorine-containing esters having 3 to 10 carbon atoms, such as ethyl trifluoroacetate, methyl trifluoroacetate, CF$_3$CF$_2$COOCH$_3$, and CF$_3$CF$_2$COOCH$_2$CH$_3$.

Examples of the fluorine-containing aromatic solvents include fluorine-containing aromatic solvents having 6 to 12 carbon atoms, such as meta-xylenehexafluoride (m-XHF), perfluorobenzene, trifluorobenzene, and monofluorobenzene. A preferable fluorine-containing aromatic solvent is meta-xylenehexafluoride.

In a preferable embodiment, the mobile phase to be used in the elution of the compound represented by formula (2) is m-xylene hexafluoride, perfluorobenzene, perfluorohexyl methyl ether, perfluorobutyl ethyl ether, perfluorobutyl methyl ether, HCFC-225, or ethyl trifluoroacetate.

In the elution of the compound represented by formula (2), the temperature of the stationary phase may preferably be −10° C. or higher and 100° C. or lower, more preferably 5° C. to 50° C., and further preferably 10° C. to 40° C., such as room temperature (25° C.).

In one embodiment, after the compound represented by formula (2) is eluted, the temperature of the stationary phase is increased to elute the compound represented by formula (3).

The mobile phase to be used in the elution of the compound represented by formula (3) is one solvent selected from the group consisting of hydrofluorocarbons, hydrochlorofluorocarbons, hydrofluoroethers, fluorine-containing ester solvents, and fluorine-containing aromatic solvents.

In one embodiment, the mobile phase to be used in the elution of the compound represented by formula (3) may be the same as the solvent used in the elution of the compound represented by formula (2).

In the elution of the compound represented by formula (3), the temperature of the stationary phase may preferably be 50° C. or higher and 150° C. or lower, more preferably 70 to 130° C., and further preferably 80° C. to 120° C.

In one embodiment, when the mixture further contains a compound represented by formula (1), the compound represented by formula (1) is eluted before the compound represented by formula (2) is eluted.

The mobile phase to be used in the elution of the compound represented by formula (1) is not limited, and is a nonpolar solvent or a low-polarity solvent, and preferably a fluorine-containing alkane solvent.

Examples of the fluorine-containing alkane solvent include perfluoroalkanes having 3 to 12 carbon atoms, such as perfluorohexane (PFH), perfluorooctane perfluoroundecane, and perfluorododecane. A preferable fluorine-containing alkane solvent is perfluorohexane.

In one embodiment, the present invention may be a method for chromatographically separating a mixture containing:

a perfluoro(poly)ether group-containing nonalcohol compound represented by the following formula (1), a perfluoro(poly)ether group-containing monoalcohol compound represented by the following formula (2), and a perfluoro(poly)ether group-containing dialcohol compound represented by the following formula (3):

$$A-Pf-A \quad (1)$$

$$A-Pf-Z \quad (2)$$

$$Z-Pf-Z \quad (3)$$

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

(i) adsorbing the mixture onto a stationary phase, (ii) eluting the perfluoro(poly)ether group-containing nonalcohol compound represented by formula (1) by a mobile phase selected from nonpolar solvents or low-polarity solvents, preferably a fluorine-containing ester solvent to separate the perfluoro(poly)ether group-containing nonalcohol compound represented by formula (1) from the perfluoro(poly)ether group-containing monoalcohol compound represented by formula (2) and the perfluoro(poly)ether group-containing dialcohol compound represented by formula (3), (iii) eluting the perfluoro(poly)ether group-containing monoalcohol compound represented by formula (2) by one mobile phase selected from the group consisting of hydrofluorocarbons, hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3), and (iv) increasing a temperature of the stationary phase to elute the perfluoro(poly)ether group-containing dialcohol compound represented by formula (3) by one mobile phase selected from the group consisting of hydrofluorocarbons, hydrochlorofluorocarbons, hydrofluoroethers, fluorine-containing ester solvents, and fluorine-containing aromatic solvents.

In one embodiment, the chromatographic separation is carried out by column chromatography. Specifically, the mixture is directly, or after mixed with a solvent, placed on a stationary phase with which a column is packed, and the mixture is adsorbed onto the stationary phase. In this case, the solvent to be used is preferably a solvent to be used as a mobile phase. Then, the solvent that serves as a mobile phase is poured from the column top, and fractions obtained from the bottom of the column are collected.

In a preferable embodiment, the column chromatography is carried out under pressure, e.g., under pressure of an inert gas such as nitrogen or argon. Preferably a pressure of 0.1 MPa or more and 1.0 MPa or less, and more preferably 0.1 MPa to 0.5 MPa, is applied.

The method of the present invention described above can be used in the production of the compound represented by formula (2) or the compound represented by formula (3).

Accordingly, the present invention provides a method for producing a perfluoro(poly)ether group-containing monoalcohol compound represented by the following formula (2):

$$A-Pf-Z \quad (2)$$

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

eluting the perfluoro(poly)ether group-containing monoalcohol compound represented by formula (2) from a mixture containing the perfluoro(poly)ether group-containing monoalcohol compound represented by formula (2) and a perfluoro(poly)ether group-containing dialcohol compound represented by the following formula (3):

$$Z-Pf-Z \quad (3)$$

wherein

Pf, A, and Z are as defined above, by using one mobile phase selected from the group consisting of hydrofluorocarbons, hydrochlorofluorocarbons, hydrofluoroethers, fluorine-containing ester solvents, and fluorine-containing aromatic solvents in chromatography involving a stationary phase selected from the group consisting of aluminum oxide, silica gel, magnesium oxide, aluminum silicate, magnesium silicate, chemically modified silica gel, and diatomaceous earth to purify the perfluoro(poly)ether group-containing monoalcohol compound represented by formula (2).

Moreover, the present invention provides a method for producing a perfluoro(poly)ether group-containing dialcohol compound represented by the following formula (3):

$$Z-Pf-Z \quad (3)$$

wherein

Pf represents a divalent perfluoropolyether group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

eluting a perfluoro(poly)ether group-containing monoalcohol compound represented by the following formula (2):

$$\text{A-Pf-Z} \tag{2}$$

wherein

Pf, and Z are as defined above, and

A each independently represents an $R^1$— group, an $R^1$—O— group, an $R^2O$—$CH_2$—$R^3$— group, or an $R^2O$—$CH_2$—$R^3$—O— group, from a mixture containing the perfluoro(poly)ether group-containing dialcohol compound represented by formula (3) and the perfluoro(poly)ether group-containing monoalcohol compound represented by formula (2) by using one mobile phase selected from the group consisting of hydrofluorocarbons, hydrochlorofluorocarbons, hydrofluoroethers, fluorine-containing ester solvents, and fluorine-containing aromatic solvents in chromatography involving a stationary phase selected from the group consisting of aluminum oxide, silica gel, magnesium oxide, aluminum silicate, magnesium silicate, chemically modified silica gel, and diatomaceous earth, and then increasing a column temperature to elute the perfluoro(poly)ether group-containing dialcohol compound represented by formula (3) by using one mobile phase selected from the group consisting of hydrofluorocarbons, hydrochlorofluorocarbons, hydrofluoroethers, fluorine-containing ester solvents, and fluorine-containing aromatic solvents.

The mixture of the compound represented by formula (2) and the compound represented by formula (2) in the above production method may be produced by, but not limited to, the following reactions.

Photooxidation reaction involving tetrafluoroethylene and oxygen, and decomposition reaction, reduction reaction, esterification reaction, fluorination reaction, and/or reduction alcoholization reaction of the resulting peroxide Oligomerization reaction of tetrafluorooxetane, and reduction reaction, esterification reaction, fluorination reaction, and/or reduction alcoholization reaction of the resulting oxetane polymer Fluorination reaction, esterification reaction, and/or reduction alcoholization reaction of polyethylene glycol Oligomerization reaction of hexafluoropropylene oxide, and fluorination reaction, esterification reaction, and/or reduction alcoholization reaction of the resulting product.

The above reactions can be carried out under reaction conditions that are commonly used by those skilled in the art.

The present invention will now be described in more detail below by way of Examples, but the present invention is not limited thereto.

EXAMPLES

In Examples, the occurrence order of the respective repeating units ($CF_2O$), ($CF_2CF_2O$), ($CF_2CF_2CF_2O$), and ($CF_2CF_2CF_2CF_2O$) constituting perfluoropolyether is not limited. Also, all chemical formulae shown below represent the average compositions.

Example 1

A stationary phase was prepared by introducing a mixture of perfluorohexane (200 g) and silica gel (80 g) into a column having a diameter of 4 cm and a height of 20 cm and then allowing perfluorohexane (300 g) to flow. Thereafter, a mixture of perfluoropolyether group-containing compounds represented by the following structure (1) (35 g, number average molecular weight (Mn)=4500, nonalcohol compound 22 wt %, monoalcohol compound 49 wt %, dialcohol compound 29 wt %) was diluted with perfluorohexane (100 g) and adsorbed onto silica gel at the column top.

$$\text{A-}(CF_2O)_k(CF_2CF_2O)_l(CF_2CF_2CF_2O)_m(CF_2CF_2CF_2CF_2O)_n\text{-A'} \tag{I}$$

wherein A and A' are any of —$CF_2Cl$, —$CF_3$, —$CF_2CF_3$, and —$CH_2OH$; k is 2; l is 22; m is 0.3; and n is 0.3.

The fractionation operation was carried out according to the following procedure.

i) Perfluorohexane was poured from the column top under a $N_2$ pressure of 0.1 MPa, and 803 g of a solution was recovered.

The analysis demonstrated that the perfluoropolyether group-containing compounds (6.26 g) obtained by concentrating this recovered product were all nonalcohol compounds.

ii) Then, m-XHF was poured from the column top under a $N_2$ pressure of 0.1 MPa, and 1015 g of a solution was recovered.

The analysis demonstrated that in the perfluoropolyether group-containing compounds (15.8 g) obtained by concentrating this recovered product, the monoalcohol compound was 90 wt %, and the dialcohol compound was 10 wt %.

iii) Then, with the column being heated to 100° C., m-XHF was poured from the column top under a $N_2$ pressure of 0.1 MPa, and 416.0 g of a solution was recovered.

The analysis demonstrated that in the perfluoropolyether group-containing compounds (10.3 g) obtained by concentrating this recovered product, the monoalcohol compound was 1 wt %, and the dialcohol compound was 99 wt %.

Example 2

A stationary phase was prepared by introducing a mixture of perfluorohexane (200 g) and silica gel (80 g) into a column having a diameter of 4 cm and a height of 20 cm and then allowing perfluorohexane (300 g) to flow. Thereafter, a mixture of compounds represented by the above structure (1) (30 g, number average molecular weight (Mn)=4500, nonalcohol compound 18 wt %, monoalcohol compound 45 wt %, dialcohol compound 37 wt %) was diluted with perfluorohexane (100 g) and adsorbed onto silica gel at the column top.

The fractionation operation was carried out according to the following procedure.

i) Perfluorohexane was poured from the column top under a $N_2$ pressure of 0.1 MPa, and 1200 g of a solution was recovered.

The analysis demonstrated that the perfluoropolyether group-containing compounds (6.80 g) obtained by concentrating this recovered product were all nonalcohol compounds.

ii) HFE 7300 (Novec™ 7300 ($C_2F_5CF(OCH_3)C_3F_7$)) was poured from the column top under a $N_2$ pressure of 0.1 MPa, and 2032 g of a solution was recovered.

The analysis demonstrated that in the perfluoropolyether group-containing compounds (14.2 g) obtained by concentrating this recovered product, the monoalcohol compound was 94 wt %, and the dialcohol compound was 6 wt %.

iii) A 1:1 mixed solution of m-XHF and methanol was poured from the column top under a $N_2$ pressure of 0.1 MPa, and 1215 g of a solution was recovered.

The analysis demonstrated that in the perfluoropolyether group-containing compounds (8.66 g) obtained by concentrating this recovered product, the monoalcohol compound was 19 wt %, and the dialcohol compound was 81 wt %.

Example 3

A stationary phase was prepared by introducing a mixture of perfluorohexane (200 g) and silica gel (78 g) into a column having a diameter of 4 cm and a height of 20 cm and then allowing perfluorohexane (300 g) to flow. Thereafter, a mixture of compounds represented by the above structure (1) (19.9 g, number average molecular weight (Mn)=3295, nonalcohol compound 41 wt %, monoalcohol compound 50 wt %, dialcohol compound 9 wt %) (wherein k is 19, l is 17, m is 0.2, and n is 0.2) was diluted with perfluorohexane (100 g) and adsorbed onto silica gel at the column top.

i) Perfluorohexane was poured from the column top under a $N_2$ pressure of 0.1 MPa, and 503 g of a solution was recovered.

The analysis demonstrated that the perfluoropolyether group-containing compounds (8.3 g) obtained by concentrating this recovered product were all nonalcohol compounds.

ii) m-XHF was poured from the column top under a $N_2$ pressure of 0.1 MPa, and 1012 g of a solution was recovered.

The analysis demonstrated that in the perfluoropolyether group-containing compounds (9.6 g) obtained by concentrating this recovered product, the monoalcohol compound was 93 wt %, and the dialcohol compound was 7 wt %.

iii) With the column being heated to 100° C., m-XHF was poured from the column top under a $N_2$ pressure of 0.1 MPa, and 590 g of a solution was recovered.

The analysis demonstrated that in the perfluoropolyether group-containing compounds (2.1 g) obtained by concentrating this recovered product, the monoalcohol compound was 2 wt %, and the dialcohol compound was 98 wt %.

Example 4

A stationary phase was prepared by introducing a mixture of perfluorohexane (200 g) and silica gel (81 g) into a column having a diameter of 4 cm and a height of 20 cm and then allowing perfluorohexane (300 g) to flow. Thereafter, a mixture of compounds represented by the above structure (1) (30 g, number average molecular weight (Mn)=3295, nonalcohol compound 40 wt %, monoalcohol compound 32 wt %, dialcohol compound 28 wt %) was diluted with perfluorohexane (100 g) and adsorbed onto silica gel at the column top.

i) Perfluorohexane was poured from the column top under a $N_2$ pressure of 0.1 MPa, and 477 g of a solution was recovered.

The analysis demonstrated that the perfluoropolyether group-containing compounds (12.16 g) obtained by concentrating this recovered product were all nonalcohol compounds.

ii) HFE 7300 was poured from the column top under a $N_2$ pressure of 0.1 MPa, and 1014 g of a solution was recovered.

The analysis demonstrated that in the perfluoropolyether group-containing compounds (9.82 g) obtained by concentrating this recovered product, the monoalcohol compound was 96 wt %, and the dialcohol compound was 4 wt %.

iii) A 1:1 mixed solution of m-XHF and methanol was poured from the column top under a $N_2$ pressure of 0.1 MPa, and 1312 g of a solution was recovered.

The analysis demonstrated that in the perfluoropolyether group-containing compounds (8.76 g) obtained by concentrating this recovered product, the monoalcohol compound was 52 wt %, and the dialcohol compound was 48 wt %.

Example 5

A stationary phase was prepared by introducing a mixture of perfluorohexane (200 g) and silica gel (81 g) into a column having a diameter of 4 cm and a height of 20 cm and then allowing perfluorohexane (300 g) to flow. Thereafter, a mixture of compounds represented by the above structure (1) (32 g, number average molecular weight (Mn)=5450, nonalcohol compound 26 wt %, monoalcohol compound 65 wt %, dialcohol compound 9 wt %) (wherein m is 31; and k, l, and n are 0) was diluted with perfluorohexane (100 g) and adsorbed onto silica gel at the column top.

i) Perfluorohexane was poured from the column top under a $N_2$ pressure of 0.1 MPa, and 523 g of a solution was recovered.

The analysis demonstrated that in the perfluoropolyether group-containing compounds (9.77 g) obtained by concentrating this recovered product, the nonalcohol compound was 83 wt %, and the dialcohol compound was 17 wt %.

ii) m-XHF was poured from the column top under a $N_2$ pressure of 0.1 MPa, and 965 g of a solution was recovered.

The analysis demonstrated that in the perfluoropolyether group-containing compounds (19.72 g) obtained by concentrating this recovered product, the monoalcohol compound was 98 wt %, and the dialcohol compound was 2 wt %.

iii) A 1:1 mixed solution of m-XHF and methanol was poured from the column top under a $N_2$ pressure of 0.1 MPa, and 1110 g of a solution was recovered.

The analysis demonstrated that in the perfluoropolyether group-containing compounds (2.5 g) obtained by concentrating this recovered product, the monoalcohol compound was 2 wt %, and the dialcohol compound was 98 wt %.

Examples 6 to 26 and Comparative Examples 1 to 12

The stationary phase of thin layer chromatography provided was a silica gel thin layer plate (length 10 cm, width 1.5 cm; 64271 TLC Aluminum Sheet Silica Gel 60F254 manufactured by Merck). A sample was obtained by diluting any of the following mixtures (A), (B), and (C) of perfluoropolyether group-containing compounds with perfluorohexane. Then, 2 to 10 μl of the sample was spotted at a place 5 mm from the lower end of the silica gel thin layer plate using a glass microcapillary, and dried. This spotted place was determined as the starting point (origin) of development.

(A) Mixture of (i) to (iii) below (weight average molecular weight (Mw)=4500, wherein k is 25, l is 22, m is 0.3, and n is 0.3)

(B) Mixture of (iv) to (vi) below (weight average molecular weight (Mw)=5500, wherein n is 31)

(C) Mixture of (iv) to (vi) below (weight average molecular weight (Mw)=4000, wherein n is 21)

$HOCH_2(CF_2O)_k(CF_2CF_2O)_l(CF_2CF_2CF_2O)_m(CF_2CF_2CF_2CF_2O)_nCF_2CH_2OH$ (i)

$CF_3O(CF_2O)_k(CF_2CF_2O)_l(CF_2CF_2CF_2O)_m(CF_2CF_2CF_2CF_2O)_nCF_2CH_2OH$ (ii)

$CF_3O(CF_2O)_k(CF_2CF_2O)_l(CF_2CF_2CF_2O)_m(CF_2CF_2CF_2CF_2O)_nCF_3$ (iii)

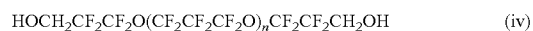

$HOCH_2CF_2CF_2O(CF_2CF_2CF_2O)_nCF_2CF_2CH_2OH$ (iv)

$CF_3CF_2CF_2O(CF_2CF_2CF_2O)_nCF_2CF_2CH_2OH$ (v)

$CF_3CF_2CF_2O(CF_2CF_2CF_2O)_nCF_2CF_2CF_3$ (vi)

Solvents (a) to (k) shown in the following table were added as developing solvents to a thin layer chromatography developing vessel to a depth of 2 to 3 mm, and the developing vessel was allowed to stand still until the vapor of the developing solvent saturated in the developing vessel. Then, the thin layer plate that had been spotted with a sample solution was gently placed in the developing vessel such that the origin was not directly submerged in the developing solvent, and the developing vessel was capped and allowed to stand still until the distal end of the solvent ascending the thin layer plate reached a place about 5 cm from the top end of the thin layer plate. Then, the thin layer plate was removed from the developing vessel, and thereafter the developing solvent was sufficiently dried. The dried thin layer plate was immersed in a 5% aqueous potassium permanganate solution and thereafter thermally dried.

Immersing the thin layer plate in a 5% aqueous potassium permanganate solution made the entire thin layer plate reddish purple. Thereon, the perfluoropolyether group-containing monoalcohol (one terminal) and the perfluoropolyether group-containing dialcohol (both terminals) appeared as white spots. The centers of the white spots of the perfluoropolyether group-containing monoalcohol and the perfluoropolyether group-containing dialcohol were marked, and the distance from the origin to the center of the spot was divided by the distance of solvent development to obtain an Rf value. It can be said that separation occurred if the Rf values of the both-terminal component and the one-terminal component were different. It can also be said that the smaller the value of Rf (both-terminal component)/Rf (one-terminal component) is, the greater the separability is.

TABLE 4

Solvent (mobile phase)

| | Compound name or trade name | Structural formula |
|---|---|---|
| a | m-xylene hexafluoride | $C_6H_4(CF_3)_2$ |
| b | Ethyl trifluoroacetate | $CF_3CO_2C_2H_5$ |
| c | Novec (TM) 7300 | $C_2F_5CF(OCH_3)CF(CF_3)_2$ |
| d | Novec (TM) 7200 | $C_4F_9OC_2H_5$ |
| e | HCFC-225 | $CF_3CF_2CHCl_2$ |
| f | Perfluorobenzene | $C_6F_6$ |
| g | Novec (TM) 7100 | $C_4F_9OCH_3$ |
| h | Vertrel XF | $C_5H_2F_{10}$ |
| i | Perfluorohexane | $C_6F_{14}$ |
| j | 5FP | $CF_3CF_2CH_2OH$ |
| k | Galden SV90 | $CF_3O(CF(CF_3)CF_2O)_m(CF_2O)_nCF_3$ |

TABLE 5

| Example | Sample | Solvent | Rf (both-terminal) | Rf (one-terminal) | Rf (both-terminal)/Rf (one-terminal) |
|---|---|---|---|---|---|
| 6 | A | a | 0.013 | 0.325 | 0.04 |
| 7 | B | a | 0.012 | 0.195 | 0.06 |
| 8 | C | a | 0.017 | 0.300 | 0.06 |
| 9 | A | b | 0.066 | 0.632 | 0.10 |
| 10 | B | b | 0.211 | 0.763 | 0.28 |
| 11 | C | b | 0.047 | 0.506 | 0.09 |
| 12 | A | c | 0.000 | 0.125 | 0.00 |
| 13 | B | c | 0.000 | 0.143 | 0.00 |
| 14 | C | c | 0.000 | 0.231 | 0.00 |
| 15 | A | d | 0.013 | 0.225 | 0.06 |
| 16 | B | d | 0.020 | 0.286 | 0.07 |
| 17 | C | d | 0.012 | 0.244 | 0.05 |
| 18 | A | e | 0.097 | 0.472 | 0.21 |
| 19 | B | e | 0.097 | 0.472 | 0.21 |
| 20 | C | e | 0.068 | 0.392 | 0.17 |
| 21 | A | f | 0.048 | 0.323 | 0.15 |
| 22 | B | f | 0.055 | 0.345 | 0.16 |

TABLE 5-continued

| Example | Sample | Solvent | Rf (both-terminal) | Rf (one-terminal) | Rf (both-terminal)/Rf (one-terminal) |
|---|---|---|---|---|---|
| 23 | C | f | 0.057 | 0.340 | 0.17 |
| 24 | A | g | 0.045 | 0.250 | 0.18 |
| 25 | B | g | 0.024 | 0.293 | 0.08 |
| 26 | C | g | 0.060 | 0.345 | 0.18 |

TABLE 6

| Comparative Example | | | | | |
|---|---|---|---|---|---|
| 1 | A | h | 0 | 0 | — |
| 2 | B | h | 0 | 0 | — |
| 3 | C | h | 0 | 0 | — |
| 4 | A | i | 0 | 0 | — |
| 5 | B | i | 0 | 0 | — |
| 6 | C | i | 0 | 0 | — |
| 7 | A | j | 0 | 0 | — |
| 8 | B | j | 0 | 0 | — |
| 9 | C | j | 0 | 0 | — |
| 10 | A | k | 0 | 0 | — |
| 11 | B | k | 0 | 0 | — |
| 12 | C | k | 0 | 0 | — |

In Examples 6 to 26 in which solvents a to g were used, the one-terminal component and the both-terminal component were separated on the TLC plate. In particular, solvents a, c, and d resulted in a small Rf (both-terminal)/Rf (one-terminal) value, and is more suitable for separating the both-terminal component and the one-terminal component. On the other hand, in Comparative Examples 1 to 12 in which solvents h to k were used, neither the one-terminal component nor the both-terminal component moved. Solvents h to k are considered as having low polarity or insufficient separability because they do not dissolve perfluoropolyether group-containing alcohols.

Comparative Example 13

A stationary phase was prepared by introducing a mixture of perfluorohexane (200 g) and silica gel (80 g) into a column having a diameter of 4 cm and a height of 20 cm and then allowing perfluorohexane (300 g) to flow. Thereafter, a mixture of perfluoropolyether group-containing compounds represented by the following structure (1) (35 g, number average molecular weight (Mn)=4300, nonalcohol compound 20 wt %, monoalcohol compound 53 wt %, dialcohol compound 27 wt %) was diluted with perfluorohexane (100 g) and adsorbed onto silica gel at the column top.

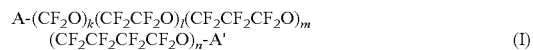

$$A-(CF_2O)_k(CF_2CF_2O)_l(CF_2CF_2CF_2O)_m(CF_2CF_2CF_2CF_2O)_n-A' \quad (I)$$

wherein A and A' are any of —$CF_2Cl$, —$CF_3$, —$CF_2CF_3$, and —$CH_2OH$; k is 2; l is 22; m is 0.3; and n is 0.3.

The fractionation operation was carried out according to the following procedure.

i) Perfluorohexane was poured from the column top under a $N_2$ pressure of 0.1 MPa, and 960.7 g of a solution was recovered.

The analysis demonstrated that the perfluoropolyether group-containing compounds (6.26 g) obtained by concentrating this recovered product were all nonalcohol compounds.

ii) Then, a mixed solvent of m-XHF:methanol=10:1 was poured from the column top under a $N_2$ pressure of 0.1 MPa, and recovered 250 ml at a time.

The weight and the composition of the perfluoropolyether group-containing compounds obtained by concentrating the recovered solutions are shown in the following table.

TABLE 7

| | Recovered weight (g) | Bifunctional component (mol %) | Monofunctional component (mol %) |
|---|---|---|---|
| Fr1 | 1 | 8.5 | 91.5 |
| Fr2 | 5 | 11.8 | 88.2 |
| Fr3 | 10 | 20.4 | 79.6 |
| Fr4 | 7 | 47.9 | 52.1 |
| Fr5 | 4 | 68.5 | 31.5 |
| Fr6 | 1 | 78.9 | 21.1 |

When a mixed solvent of m-XHF and methanol was used in the above-described manner, the initial fractions were rich in monofunctional component, but the bifunctional component gradually increased. That is to say, fractions were obtained in which the monofunctional component and the bifunctional component were not separated (Fr 3 to 6 in particular). On the other hand, as described above, in the Examples in which a single solvent was used, the monofunctional component and the bifunctional component are favorably separated. Furthermore, since a mixed solvent is used in Comparative Example 13, it is difficult to individually isolate m-XHF and methanol from the obtained fractions, which is disadvantageous from the viewpoint of reuse.

The disclosure of the present invention may include the following embodiments.

Embodiment 1

A method for chromatographically separating a mixture containing a perfluoro(poly)ether group-containing monoalcohol compound represented by the following formula (2) and a perfluoro(poly)ether group-containing dialcohol compound represented by the following formula (3):

  (2)

  (3)

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

adsorbing the mixture onto a stationary phase; and eluting the perfluoro(poly)ether group-containing monoalcohol compound represented by formula (2) by one mobile phase selected from the group consisting of hydrofluorocarbons, hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing monoalcohol compound represented by formula (3).

Embodiment 2

The method according to embodiment 1, further comprising increasing a temperature of the stationary phase to elute the perfluoro(poly)ether group-containing dialcohol compound represented by formula (3) by one mobile phase selected from the group consisting of hydrofluorocarbons, hydrochlorofluorocarbons, hydrofluoroethers, fluorine-containing ester solvents, and fluorine-containing aromatic solvents after separating the perfluoro(poly)ether group-containing monoalcohol compound represented by formula (2).

Embodiment 3

A method for chromatographically separating a mixture containing:

a perfluoro(poly)ether group-containing nonalcohol compound represented by the following formula (1), a perfluoro(poly)ether group-containing monoalcohol compound represented by the following formula (2), and a perfluoro(poly)ether group-containing dialcohol compound represented by the following formula (3):

  (1)

  (2)

  (3)

wherein

Pf represents a divalent perfluoropolyether group,

A each independently represents an $R^1$— group, an $R^1$—O— group, an $R^2O$—$CH_2$—$R^3$— group, or an $R^2O$—$CH_2$—$R^3$—O— group, $R^1$ each independently represents an alkyl group, $R^2$ each independently represents an alkyl group, $R^3$ each independently represents a divalent organic group containing 1 to 4 carbon atoms, Z each independently represents an —$R^5$—$CH_2OH$ group or an —O—$R^5$—$CH_2OH$ group, and $R^5$ each independently represents a bond or a divalent organic group containing 1 to 4 carbon atoms, the method comprising:

(i) adsorbing the mixture onto a stationary phase;

(ii) eluting the perfluoro(poly)ether group-containing nonalcohol compound represented by formula (1) by a mobile phase selected from nonpolar solvents or low-polarity solvents to separate the perfluoro(poly)ether group-containing nonalcohol compound represented by formula (1) from the perfluoro(poly)ether group-containing monoalcohol compound represented by formula (2) and the perfluoro(poly)ether group-containing dialcohol compound represented by formula (3);

(iii) eluting the perfluoro(poly)ether group-containing monoalcohol compound represented by formula (2) by one mobile phase selected from the group consisting of hydrofluorocarbons, hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3); and (iv) increasing a temperature of the stationary phase to elute the perfluoro(poly)ether group-containing dialcohol compound represented by formula (3) by one mobile phase selected from the group consisting of hydrofluorocarbons, hydrochlorofluorocarbons, hydrofluoroethers, fluorine-containing ester solvents, and fluorine-containing aromatic solvents.

Embodiment 4

The method according to embodiment 2 or 3, wherein a column temperature when eluting the perfluoro(poly)ether group-containing dialcohol compound represented by formula (3) is 50 to 150° C.

Embodiment 5

The method according to any one of embodiments 1 to 4, wherein Pf is a perfluoro(poly)ether group represented by:

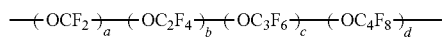

wherein a, b, c, and d are each independently an integer of 0 or 1 or more; the sum of a, b, c, and d is at least 1; and the occurrence order of the respective repeating units in parentheses with the subscript a, b, c or d is not limited in the formula.

Embodiment 6

The method according to any one of embodiments 1 to 5, wherein in formula (1) or (2), $R^1$ is each independently a $C_{1-16}$ perfluoroalkyl group, $HCF_2(CF_2)_g-$, or $ClCF_2(CF_2)_g-$, and g is an integer of 0 or more and 15 or less.

Embodiment 7

The method according to embodiment 5 or 6, wherein in formulae (1) to (3), b is an integer of 1 or more and 200 or less, and a, c, and d are 0.

Embodiment 8

The method according to embodiment 5 or 6, wherein in formulae (1) to (3), a and b are each independently an integer of 0 or more and 30 or less, and c and d are each independently an integer of 1 or more and 200 or less.

Embodiment 9

The method according to any one of embodiments 1 to 8, wherein Pf in formulae (1) to (3) has a number average molecular weight of 500 to 100,000.

Embodiment 10

The method according to any one of embodiments 1 to 9, wherein the mobile phase for eluting the perfluoro(poly)ether group-containing monoalcohol compound represented by formula (2) is m-xylene hexafluoride, perfluorobenzene, perfluorohexyl methyl ether, perfluorobutyl ethyl ether, perfluorobutyl methyl ether, HCFC-225, or ethyl trifluoroacetate.

Embodiment 11

A method for producing a perfluoro(poly)ether group-containing monoalcohol compound represented by the following formula (2):

wherein
Pf represents a divalent perfluoropolyether group,
A each independently represents an $R^1-$ group, an $R^1-O-$ group, an $R^2O-CH_2-R^3-$ group, or an $R^2O-CH_2-R^3-O-$ group,
$R^1$ each independently represents an alkyl group,
$R^2$ each independently represents an alkyl group,
$R^3$ each independently represents a divalent organic group containing 1 to 4 carbon atoms,
Z each independently represents an $-R^5-CH_2OH$ group or an $-O-R^5-CH_2OH$ group, and
$R^5$ each independently represents a bond or a divalent organic group containing 1 to 4 carbon atoms, the method comprising:
eluting the perfluoro(poly)ether group-containing monoalcohol compound represented by formula (2) from a mixture containing the perfluoro(poly)ether group-containing monoalcohol compound represented by formula (2) and a perfluoro(poly)ether group-containing dialcohol compound represented by the following formula (3):

wherein
Pf, A, and Z are as defined above,
by using one mobile phase selected from the group consisting of hydrofluorocarbons, hydrochlorofluorocarbons, hydrofluoroethers, fluorine-containing ester solvents in chromatography involving a stationary phase, and fluorine-containing aromatic solvents to purify the perfluoro(poly)ether group-containing monoalcohol compound represented by formula (2).

Embodiment 12

A method for producing a perfluoro(poly)ether group-containing dialcohol compound represented by the following formula (3):

wherein
Pf represents a divalent perfluoropolyether group,
$R^1$ each independently represents an alkyl group,
$R^2$ each independently represents an alkyl group,
$R^3$ each independently represents a divalent organic group containing 1 to 4 carbon atoms,
Z each independently represents an $-R^5-CH_2OH$ group or an $-O-R^5-CH_2OH$ group, and
$R^5$ each independently represents a bond or a divalent organic group containing 1 to 4 carbon atoms, the method comprising:
eluting a perfluoro(poly)ether group-containing monoalcohol compound represented by the following formula (2):

wherein
Pf, and Z are as defined above, and
A each independently represents an $R^1-$ group, an $R^1-O-$ group, an $R^2O-CH_2-R^3-$ group, or an $R^2O-CH_2-R^3-O-$ group, from a mixture containing the perfluoro(poly)ether group-containing dialcohol compound represented by formula (3) and the perfluoro(poly)ether group-containing monoalcohol compound represented by formula (2) by using one mobile phase selected from the group consisting of hydrofluorocarbons, hydrochlorofluorocarbons, hydrofluoroethers, fluorine-containing ester solvents, and fluorine-containing aromatic solvents in chromatography involving a stationary phase, and then increasing a column temperature to elute the perfluoro(poly)ether group-containing dialcohol compound represented by formula (3) by using one mobile phase selected from the group consisting of hydrofluorocarbons, hydrochlorofluorocarbons, hydrofluoroethers, fluorine-containing ester solvents, and fluorine-containing aromatic solvents.

Embodiment 13

The method according to any one of embodiments 1 to 12, wherein the stationary phase is selected from the group consisting of aluminum oxide, silica gel, magnesium oxide, aluminum silicate, magnesium silicate, chemically modified silica gel, and diatomaceous earth.

Embodiment 14

The method according to any one of embodiments 1 to 13, wherein the stationary phase is silica gel.

INDUSTRIAL APPLICABILITY

The present invention can be used for separating a perfluoro(poly)ether group-containing monoalcohol compound and/or a perfluoro(poly)ether group-containing dialcohol compound from a mixture containing perfluoro(poly)ether group-containing alcohol compounds.

The invention claimed is:
1. A method for chromatographically separating a mixture comprising a perfluoro(poly)ether group-containing monoalcohol compound represented by the following formula (2) and a perfluoro(poly)ether group-containing dialcohol compound represented by the following formula (3):

A-Pf-Z    (2)

Z-Pf-Z    (3)

wherein
Pf represents a divalent perfluoropolyether group,
A each independently represents an $R^1$— group, an $R^1$—O— group, an $R^2O$—$CH_2$—$R^3$— group, or an $R^2O$—$CH_2$—$R^3$—O— group,
$R^1$ each independently represents an alkyl group,
$R^2$ each independently represents an alkyl group,
$R^3$ each independently represents a divalent organic group containing 1 to 4 carbon atoms,
Z each independently represents an —$R^5$—$CH_2OH$ group or an —O—$R^5$—$CH_2OH$ group, and
$R^5$ each independently represents a bond or a divalent organic group containing 1 to 4 carbon atoms,
the method comprising:
adsorbing the mixture onto a stationary phase by using the same solvent as a solvent used as a mobile phase described below, and
eluting the perfluoro(poly)ether group-containing monoalcohol compound represented by formula (2) by one mobile phase of a single solvent in a liquid state selected from the group consisting of hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3).

2. The method according to claim 1, further comprising increasing a temperature of the stationary phase to elute the perfluoro(poly)ether group-containing dialcohol compound represented by formula (3) by one mobile phase of a single solvent in a liquid state selected from the group consisting of hydrofluorocarbons, hydrochlorofluorocarbons, hydrofluoroethers, fluorine-containing ester solvents, and fluorine-containing aromatic solvents after separating the perfluoro(poly)ether group-containing monoalcohol compound represented by formula (2).

3. A method for chromatographically separating a mixture comprising:
a perfluoro(poly)ether group-containing nonalcohol compound represented by the following formula (1),
a perfluoro(poly)ether group-containing monoalcohol compound represented by the following formula (2), and
a perfluoro(poly)ether group-containing dialcohol compound represented by the following formula (3):

A-Pf-A    (1)

A-Pf-Z    (2)

Z-Pf-Z    (3)

wherein
Pf represents a divalent perfluoropolyether group,
A each independently represents an $R^1$— group, an $R^1$—O— group, an $R^2O$—$CH_2$—$R^3$— group, or an $R^2O$—$CH_2$—$R^3$—O— group,
$R^1$ each independently represents an alkyl group,
$R^2$ each independently represents an alkyl group,
$R^3$ each independently represents a divalent organic group containing 1 to 4 carbon atoms,
Z each independently represents an —$R^5$—$CH_2OH$ group or an —O—$R^5$—$CH_2OH$ group, and
$R^5$ each independently represents a bond or a divalent organic group containing 1 to 4 carbon atoms,
the method comprising:
(i) adsorbing the mixture onto a stationary phase,
(ii) eluting the perfluoro(poly)ether group-containing nonalcohol compound represented by formula (1) by a mobile phase selected from nonpolar solvents and low-polarity solvents to separate the perfluoro(poly)ether group-containing nonalcohol compound represented by formula (1) from the perfluoro(poly)ether group-containing monoalcohol compound represented by formula (2) and the perfluoro(poly)ether group-containing dialcohol compound represented by formula (3),
(iii) eluting the perfluoro(poly)ether group-containing monoalcohol compound represented by formula (2) by one mobile phase of a single solvent in a liquid state selected from the group consisting of hydrochlorofluorocarbons, hydrofluoroethers, fluorine-containing ester solvents, and fluorine-containing aromatic solvents to separate the perfluoro(poly)ether group-containing monoalcohol compound represented by formula (2) from the perfluoro(poly)ether group-containing dialcohol compound represented by formula (3), and (iv) increasing a temperature of the stationary phase to elute the perfluoro(poly)ether group-containing dialcohol compound represented by formula (3) by one mobile phase of a single solvent in a liquid state selected from the group consisting of hydrofluorocarbons, hydrochlorofluorocarbons, hydrofluoroethers, fluorine-containing ester solvents, and fluorine-containing aromatic solvents.

4. The method according to claim 2, wherein a column temperature when eluting the perfluoro(poly)ether group-containing dialcohol compound represented by formula (3) is 50 to 150° C.

5. The method according to claim 1, wherein Pf is a perfluoro(poly)ether group represented by:

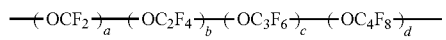

wherein a, b, c, and d are each independently an integer of 0 or 1 or more; the sum of a, b, c, and d is at least 1; and the occurrence order of the respective repeating units in parentheses with the subscript a, b, c or d is not limited in the formula.

6. The method according to claim 3, wherein in formula (1) or (2), $R^1$ is each independently a $C_{1-16}$ perfluoroalkyl group, $HCF_2(CF_2)_g$—, or $ClCF_2(CF_2)_g$—, and g is an integer of 0 or more and 15 or less.

7. The method according to claim 5, wherein b is an integer of 1 or more and 200 or less, and a, c, and d are 0.

8. The method according to claim 5, wherein a and b are each independently an integer of 0 or more and 30 or less, and c and d are each independently an integer of 1 or more and 200 or less.

9. The method according to claim 3, wherein Pf in formulae (1) to (3) has a number average molecular weight of 500 to 100,000.

10. The method according to claim 1, wherein the mobile phase for eluting the perfluoro(poly)ether group-containing monoalcohol compound represented by formula (2) is m-xylene hexafluoride, perfluorobenzene, perfluorohexyl methyl ether, perfluorobutyl ethyl ether, perfluorobutyl methyl ether, HCFC-225, or ethyl trifluoroacetate.

11. A method for producing a perfluoro(poly)ether group-containing monoalcohol compound represented by the following formula (2):

wherein
Pf represents a divalent perfluoropolyether group,
A each independently represents an $R^1$— group, an $R^1$—O— group, an $R^2O$—$CH_2$—$R^3$— group, or an $R^2O$—$CH_2$—$R^3$—O— group,
$R^1$ each independently represents an alkyl group,
$R^2$ each independently represents an alkyl group,
$R^3$ each independently represents a divalent organic group containing 1 to 4 carbon atoms,
Z each independently represents an —$R^5$—$CH_2OH$ group or an —O—$R^5$—$CH_2OH$ group, and
$R^5$ each independently represents a bond or a divalent organic group containing 1 to 4 carbon atoms,
the method comprising:
adsorbing a mixture comprising the perfluoro(poly)ether group-containing monoalcohol compound represented by formula (2) and a perfluoro(poly)ether group-containing dialcohol compound represented by the following formula (3):

wherein Pf, A, and Z are as defined above onto a stationary phase by using the same solvent as a solvent used as a mobile phase described below, and eluting the perfluoro(poly)ether group-containing monoalcohol compound represented by formula (2) from the mixture, by using one mobile phase of a single solvent in a liquid state selected from the group consisting of hydrochlorofluorocarbons, hydrofluoroethers, fluorine-containing ester solvents, and fluorine-containing aromatic solvents in chromatography using a stationary phase to purify the perfluoro(poly)ether group-containing monoalcohol compound represented by formula (2).

12. A method for producing a perfluoro(poly)ether group-containing dialcohol compound represented by the following formula (3):

wherein
Pf represents a divalent perfluoropolyether group,
$R^1$ each independently represents an alkyl group,
$R^2$ each independently represents an alkyl group,
$R^3$ each independently represents a divalent organic group containing 1 to 4 carbon atoms,
Z each independently represents an —$R^5$—$CH_2OH$ group or an —O—$R^5$—$CH_2OH$ group, and
$R^5$ each independently represents a bond or a divalent organic group containing 1 to 4 carbon atoms,
the method comprising:
eluting a perfluoro(poly)ether group-containing monoalcohol compound represented by the following formula (2):

wherein
Pf, and Z are as defined above, and
A each independently represents an $R^1$— group, an $R^1$—O— group, an $R^2O$—$CH_2$—$R^3$— group, or an $R^2O$—$CH_2$—$R^3$—O— group,
from a mixture comprising the perfluoro(poly)ether group-containing dialcohol compound represented by formula (3) and the perfluoro(poly)ether group-containing monoalcohol compound represented by formula (2) by using one mobile phase of a single solvent in a liquid state selected from the group consisting of hydrochlorofluorocarbons, hydrofluoroethers, fluorine-containing ester solvents, and fluorine-containing aromatic solvents in chromatography using a stationary phase, and then increasing a column temperature to elute the perfluoro(poly)ether group-containing dialcohol compound represented by formula (3) by using one mobile phase of a single solvent in a liquid state selected from the group consisting of hydrofluorocarbons, hydrochlorofluorocarbons, hydrofluoroethers, fluorine-containing ester solvents, and fluorine-containing aromatic solvents.

13. The method according to claim 1, wherein the stationary phase is selected from the group consisting of aluminum oxide, silica gel, magnesium oxide, aluminum silicate, magnesium silicate, chemically modified silica gel, and diatomaceous earth.

14. The method according to claim 1, wherein the stationary phase is silica gel.

* * * * *